United States Patent [19]

Watson

[11] 4,142,508

[45] Mar. 6, 1979

[54] METHOD FOR SPLICING CABLES AND HOT PACK FOR USE THEREIN

[75] Inventor: Susan S. Watson, Mountain View, Calif.

[73] Assignee: Kay Laboratories, Inc., San Diego, Calif.

[21] Appl. No.: 784,700

[22] Filed: Apr. 5, 1977

Related U.S. Application Data

[60] Continuation-in-part of Ser. No. 585,172, Jun. 9, 1975, abandoned, which is a division of Ser. No. 479,844, Jun. 17, 1974, abandoned.

[51] Int. Cl.² ............................................... F24J 1/00
[52] U.S. Cl. ........................................ 126/263; 44/3 A; 252/70; 423/497
[58] Field of Search ......................... 126/263; 252/70; 44/3 R, 3 A, 3 C; 122/21; 423/497

[56] References Cited

U.S. PATENT DOCUMENTS

| 2,239,410 | 4/1941 | Bonat | 126/263 |
| 3,175,558 | 3/1965 | Caillouette et al. | 126/263 |
| 3,461,073 | 8/1969 | Crowell, Jr. et al. | 252/70 |
| 3,585,982 | 6/1971 | Hollinshead | 126/263 |
| 3,766,079 | 10/1973 | Jackman et al. | 126/263 |

Primary Examiner—Ronald C. Capossela
Attorney, Agent, or Firm—Ellsworth R. Roston

[57] ABSTRACT

In a method for splicing cables, a first cable is connected to a second cable to form a junction and a heat shrinkable sleeve is positioned over the junction. A portable hot pack having properties for developing a temperature in excess of 250° C. is conformed around the sleeve to shrink the sleeve around the junction and thereby seal and insulate the junction. The hot pack can include first and second chemicals which react to initiate a series of heat producing reactions which occur at different temperatures to incrementally elevate the temperature of the hot pack.

36 Claims, 14 Drawing Figures

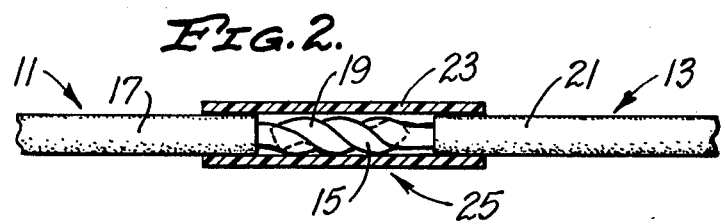
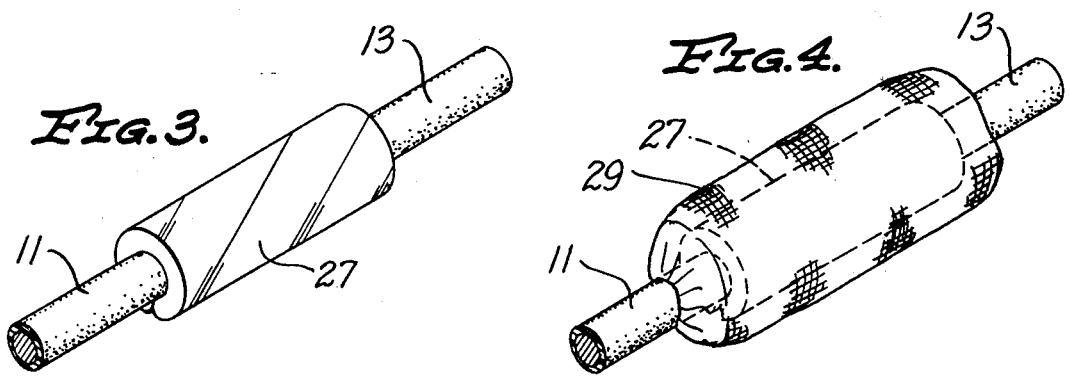
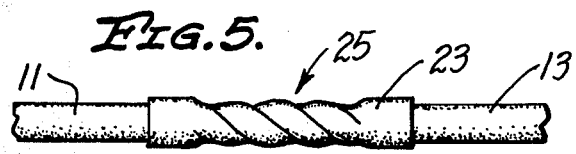
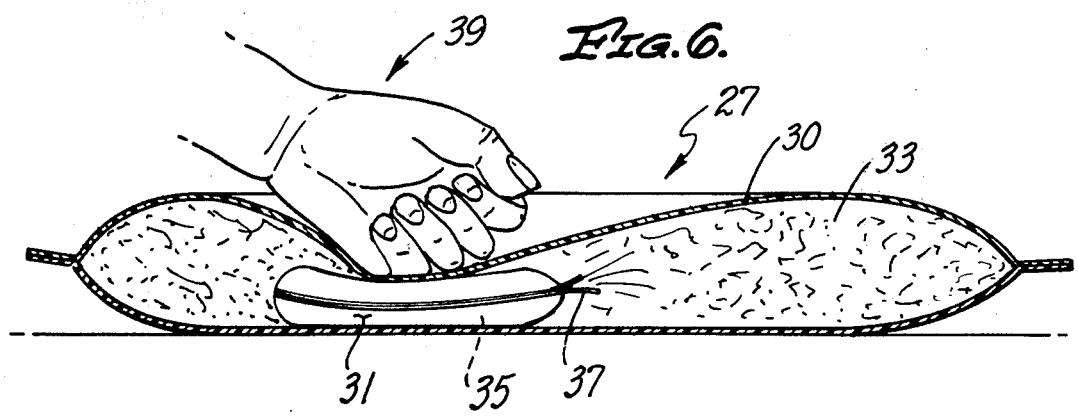

METHOD FOR SPLICING CABLES AND HOT PACK FOR USE THEREIN

This is a continuation-in-part of application Ser. No. 585,172 filed June 9, 1975 now abandoned, which in turn was a division of application Ser. No. 479,844 filed June 17, 1974, and entitled "Method for Splicing Cables and Hot Pack for Use Therein", now abandoned.

BACKGROUND OF THE INVENTION

1. Field of the Invention

This invention relates generally to portable sources of heat and more specifically to sources of heat which are capable of producing temperatures in excess of 250° C.

2. Description of the Prior Art

It is often desirable to have a heat source which is capable of providing temperatures in excess of 250° C. Such devices can be used, for example, in an oven, a hot plate, or a space heater.

Such devices are also particularly advantageous for use with heat shrinkable tubing of the type commonly employed in splicing power and telephone cables. Thus, when two cables are spliced together to form a junction, a piece of heat shrinkable tubing can be placed over the junction and a high temperature heat source can be used to shrink the tubing and thereby seal the junction and form an insulation over the splice. It is particularly desirable that the heat from the heat source be applied evenly to the tubing so that it shrinks uniformly around the splice without burning the tubing. This method of cable splicing is often performed in remote locations and in dangerous environments such as mines and manholes wherein a highly combustible methane gas often collects.

There are many types of heat sources in the prior art but most of these sources can be grouped into three general classes: electrical heat sources, combustion heat sources, and chemical heat sources.

Electrical heat sources typically include a resistance element which provides heat in response to a flow of electrical current through the resistance element. The primary deficiency of these electrical devices is associated with their use of large quantities of electrical power. In order to make such heat sources somewhat portable, this power has typically been provided by electrical storage devices such as batteries. Such batteries have been relatively large and heavy. They typically include an acidic flux, and tend to give off combustible gases which would increase the danger associated with an already explosive environment. The electrical heat sources provide for a relatively high temperature only in close proximity to the limited area of the resistance element. These devices do not provide a particularly uniform heat and therefore would have limited value for use with heat shrinkable tubing.

The combustion heat sources rely upon the ignition of a combustible fluid, such as gasoline, or a gas such as propane. An example of this type device is a propane blow torch which is sometimes used as the heat source in power and telephone cable splicing. A propane blow torch relies upon the burning of the propane gas to produce a flame having a high temperature. For use in cable splicing, this type of heat source has the same deficiency as the electrical heat source — the heat is very localized in proximity to the flame. When used with heat shrinkable tubing, the tubing tends to shrink nonuniformly over its area. Some operators have developed a high degree of skill in moving the propane flame over the surface of the heat shrinkable tubing to provide for more uniform heat distribution. With such a high, localized temperature the tubing is easily burned; this limits the effectiveness of the sealing and insulating characteristics of the tubing.

As exemplified by the propane blow torch, the combustion heat sources typically produce a flame. Such a heat source would be highly undesirable for use in dangerous environments such as mines and manholes wherein highly combustible gases often collect. In such an environment, any heat source producing a flame could cause a severe explosion.

Chemical heat sources are often desirable in a particular environment since they do not produce a flame. Typical of such heat sources is the flameless cooking apparatus disclosed in U.S. Pat. No. 3,314,413. This patent suggests the combination of aluminum powder, sodium hydroxide flakes, copper sulfate, and sodium chloride to which water can be added to produce an exothermic reaction. Although this flameless source of heat can be relatively portable, it suffers from many deficiencies of its own. For example, when the aluminum powder in the mixture is being consumed by the reaction, free hydrogen is given off. This gas is well known to be extremely combustible. Thus, the use of such a device in a mine or manhole would only increase the combustible nature of the environment. Another by-product of this exothermic reaction is hydrochloric gas which is well known to be extremely toxic and particularly corrosive of metals.

The flameless cooking apparatus will provide a temperature of only approximately 150° C. This makes it useful for boiling water but of less advantage for shrinking tubing. Furthermore, the chemicals forming the flameless cooking device have a solid, block configuration that is not conformable to an irregular surface such as the surface of a piece of tubing.

A further deficiency of the flameless cooking apparatus is that it is not self-contained. In order to fire the apparatus, water must be added to the chemical package. Thus, the package must be provided with means for opening the package for insertion of the water. Since a portion of the water will tend to boil from the package, means must also be provided to permit the escape of steam. The powdered aluminum is highly reactive and almost explosive in steam. Thus, the flameless cooking apparatus is relatively unsafe and its temperature range is somewhat limited for use in cable splicing.

SUMMARY OF THE INVENTION

The hot pack of the present invention provides a source of flameless heat which can be sustained at high temperatures, such as 250° C., for an extended period of time, such as 20 minutes. The device is self-contained and portable. It includes chemicals which are combined in an exothermic reaction; however, as opposed to the devices of the prior art, no toxic or caustic chemicals are given off by the reaction. The chemicals are initially relatively fluid so that the hot pack can be conformed to substantially any shape such as a tubular shape. This fluid characteristic also provides for the uniform application of heat over an area of contact.

In a particular embodiment of the hot pack, a first container encloses a second rupturable container. Ethylene glycol including an intrinsic impurity of water is disposed in the second container and anhydrous magnesium chloride is disposed interiorly of the first container and exteriorly of the second container. Upon activation, the second container ruptures the permit the mixing of the ethylene glycol and the magnesium chloride. This initiates several reactions, some of which occur in series. Initially the water impurity in the ehtylene glycol will react with the magnesium chloride to form magnesium chloride hexahydrate and to give off a first quantity of heat. In a second reaction, the ethylene glycol will react with the magnesium chloride to form magnesium chloride triethylene glycolate. The second reaction also produces a second quantity of heat. In the presence of heat produced during the first two reactions, pairs of the ethylene glycol molecules will form a water molecule leaving a molecule of diethylene glycol. This third reaction will produce a third quantity of heat by reacting with the water by-product.

In the presence of the heat from the first three reactions, some of the molecules of diethylene glycol will break down by forming a further molecule of water and organic products. This further reaction will produce a fourth quantity of heat. Finally, the decomposition products from the first four reactions will combine in the presence of a high degree of heat to form a polymeric material.

Since the heat present at the outer surface of the hot pack will tend to be dissipated to the surrounding area, the highest temperatures will occur at the center of the hot pack. It follows that those reactions requiring the most heat will tend to take place at the center of the hot pack. It is particularly desirable that the high heat reactions take place at the center of the pack so that the heat is preserved to facilitate the occurrence of each of the reactions. If all of the reactions are permitted to occur, the amount of heat present in the hot pack can raise its temperature to a magnitude such as 250° C.

With the addition of a thickening agent to the ethylene glycol, the reactions can be slowed at least initially so that the temperature of the hot pack rises more slowly. This extends the period of time during which the pack can be handled to facilitate thorough mixing of the chemicals.

Such a hot pack is particularly desirable for use in a preferred method for splicing cables, such as power transmission cables and telephone cables. A piece of heat shrinkable tubing can be slid over one of a pair of conductor ends prior to the formation of the splice. After the conductor ends are joined, the tubing can then be positioned over the junction. At this point, the flameless hot pack can be activated by rupturing the second container to release the ethylene glycol into the magnesium chloride. After these chemicals are mixed, the flexible hot packs can be wrapped around the heat shrinkable tubing and held in place by an insulation blanket. As the temperature of the pack rises, heat will be uniformly applied to the tubing to shrink its diametral dimension. Thus, the tubing can be shrunk to conform to the shape of the splice and thereby seal, insulate and protect the junction. After this is accomplished, the insulation blanket and heat source can be removed.

These and other features and advantages of the present invention will become more apparent with a description of the preferred embodiments with reference to the associated drawings.

DESCRIPTION OF THE DRAWINGS

FIG. 1 is a side elevational view of a pair of cables each having insulation stripped from the ends thereof to bare an associate conductor, and a heat shrinkable sleeve disposed over one of the cable ends;

FIG. 2 is a side elevational view of the cables with the conductors twisted together to form a junction and with the sleeve shown in cross section and positioned over the junction;

FIG. 3 is a perspective view of the cables with a hot pack disposed around the sleeve;

FIG. 4 is a perspective view of the cables with an insulation blanket disposed around the hot pack;

FIG. 5 is a perspective view of the cables with the insulation blanket and the hot pack removed to exposed the sleeve shrunk around the junction to hermetically seal and insulate the conductors;

FIG. 6 is a cross-sectional view of a preferred embodiment of the hot pack having a first container enclosing a first chemical and a second rupturable container enclosing a second chemical within the first container, the second container being struck to activate the hot pack;

DESCRIPTION OF PREFERRED EMBODIMENTS

Figure 7:
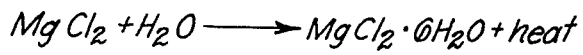
FIG. 7 illustrates a chemical equation showing a first reaction which occurs when the hot pack includes magnesium chloride and ethylene glycol with an impurity of water.

The present invention concerns a portable hot pack which is capable of producing temperatures in excess of 250° C. and a preferred method for splicing cables using the hot pack. Some of the steps in this preferred method for cable splicing are shown in FIGS. 1 through 5.

Illustrated in FIG. 1 are a pair of cables designated generally by the reference numerals 11 and 13. The cable 11 includes a conductor 15 which is surrounded by insulation 17 along substantially its entire length. Similarly, the cable 13 includes a conductor 19 surrounded by insulation 21 along substantially its entire length. The insulation 17 and 21 on the cables 11 and 13 serves at least two purposes. First, it hermetically seals the associated conductors 15 and 19 to inhibit corrosion. Second, it isolates the conductors 15 and 19 so that electric current flowing therethrough is not short circuited through apparatus or personnel which might come in contact with the cables 11 and 13.

It should be understood that the cables 11 and 13 are merely representative of many types of cables which can be spliced. For example, the cables 11 and 13 may be power cables wherein the conductors 15 and 19 may have diameters of several inches. The cables 11 and 13 may also be one of several cables in a multiple conductor cable. The multiple conductor cables may be power cables including, for example, three power cables such as the cables 11 and 13. The multiple conductor cables may also be telephone cables including many conductor pairs in which case the cables 11 and 13 may represent, for example, only one of 500 wires in the multiple conductor cable.

The splicing of the cables 11 and 13 is desirable so that current flowing in the conductor 15 can be transferred to the conductor 19 for distribution to a distant location. One of the first steps in the splicing process is to strip the insulation 17 and 21 from the ends of the cables 11 and 13 respectively to bare the conductors 15 and 19. It is these conductors 15 and 19 which are joined to provide electrical continuity between the cables 11 and 13. Once the conductors 15 and 19 have been joined, there will be no insulation, such as the insulation 17 and 21, around the junction. Therefore, in the preferred method herein disclosed, an insulating type material is provided around the conductors after they are joined to hermetically seal the junction and to insulate the conductors 15 and 19 at the junction.

This insulation type material can initially be in the form of a piece of tubing such as the sleeve designated generally by the numeral 23. This sleeve 23 can be in the form of a cylinder initially having a diameter greater than the diameter of the cables 11 and 13. The sleeve 23 is formed from a heat shrinkable material so that in response to an elevated temperature, the sleeve 23 will shrink to a diameter less than the diameter of the conductors 15 and 19. Sleeves of this type can be made from a polymer material which tends to shrink, for example, at a temperature such as 135° C. which is sustained for a period such as ten minutes. Such sleeves can be purchased in various sizes, shapes, and shrinking temperatures from the Raychem Corporation of Menlo Park, California.

Prior to the joining of the conductors 15 and 19, the sleeve 23 is positioned over one of the cable ends such as the end of the cable 11 as illustrated in FIG. 1. Then the conductors 15 and 19 can be joined as shown in FIG. 2 to form a conductor junction designated generally by the reference numeral 25. The conductors 15 and 19 may be twisted at the junction 25 to increase the electrical continuity between the cables 11 and 13 and also to enhance the mechanical strength of the junction 25 although this step is typically omitted.

Once the conductors 15 and 19 have been joined, the sleeve 23 can be moved along the cable 11 until it is positioned over the junction 25 with its ends preferably extending over the insulation 17 and the insulation 21 of the cables 11 and 13 respectively. In FIG. 2 the sleeve 23 is shown in axial cross section to more clearly illustrate the conductors 15 and 19 at the junction 25.

Once the conductors 15 and 19 have been joined, and the sleeve 23 has been positioned over the junction 25, it is desirable to heat the sleeve 23 so that it shrinks to hermetically seal the conductors 15 and 19 at the junction 25. It is of particular advantage that the shrinking of the sleeve 23 can be accomplished using a portable heat source which is capable of developing temperatures in excess of 250° C. Structural features of a heat source particularly desirable for use in the present method will be described in greater detail below. However, it is readily apparent during this discussion of a preferred cable splicing method that it is highly desirable to have a heat source which not only provides the high temperatures needed but also provides portability and flexibility. The latter characteristic is desirable so that the heat source can be wrapped around an irregular surface such as that provided by the sleeve 23.

As noted, this type of splicing is often done in dangerous environments such as mines and manholes where methane gas collects. Therefore, it is desirable that the heat source be flameless and that it give off no combustible, caustic, or toxic gases. In accordance with the present invention, a heat source in the form of a portable hot pack 27, is provided which has these highly desirable characteristics. The hot pack 27 is capable of generating temperatures in excess of 250° C. and has flexible, generally fluid characteristics, immediately after activation which permit it to be formed around the sleeve 23. These fluid characteristics also enhance the even distribution of the heat along the surface of the sleeve 23.

In this preferred method for cable splicing the hot pack 27 is activated and wrapped around the sleeve 23, as shown in FIG. 3, so that its high temperature heat shrinks the sleeve 23 into close proximity with the conductors 15 and 19. The hot pack 27 may be wrapped in blanket 29 as shown in FIG. 4 to maintain the pack 27 in contact with the sleeve 23. The blanket 29 preferably has insulation characteristics which inhibit the loss of heat from the pack 27 to the atmosphere. After a suitable length of time, such as 20 minutes, the blanket 29 and the hot pack 27 can be removed to expose the sleeve 23 which will have shrunk, as shown in FIG. 5, to hermetically seal and insulate the conductors 15 and 19 at the junction 25. It will be apparent to those skilled in the art that several of the hot packs 27 may be used simultaneously to heat an extended length of the sleeve 23.

The hot pack 27 of the present invention is illustrated in greater detail in FIG. 6. The pack 27 includes a first container 30 and a second container 31 disposed interiorly of the first container 30. A first chemical 33, which may have a particular configuration, is preferably disposed exteriorly of the second container 31 but interiorly of the first container 30. A second chemical 35, preferably having a fluid state, is disposed interiorly of the second container 31.

In this particular embodiment, the second container 31 is provided with a seal 37 which can be broken to rupture the container 31 and thereby release the second chemical 35 into contact with the first chemical 33. The breaking of the seal 37 to provide for the mixing of the chemicals 33 and 35 can be accomplished by striking the container 31 within the container 30, for example, with a first 39. The structural features of the container 30 and 31 are described in greater detail and claimed in a patent application for a HOT OR COLD PACK AND APPARATUS FOR MAKING SAME, Ser. No. 290,003, filed on Sept. 18, 1972, now U.S. Pat. No. 3,892,060 and assigned of record to the assignee of record of the present application. It will be apparent that other means for initially isolating the chemicals 33, 35, and subsequently rupturing the container 31, can be employed within the scope of the present invention.

When the seal 37 is broken, the first and second chemicals 33 and 35, respectively, mix and react to give off heat. This exothermic reaction and reactions which result therefrom provide the pack 27 with its highly desirable elevated temperature. It will be understood that these chemical reactions provide a particular quantity of heat and the actual temperature of the pack 27 will vary with the rate at which this heat is dissipated to the environment.

It is desirable that the material from which the container 29 is formed have characteristics including a melting point greater than the temperature of reaction. With this characteristic, the container 29 will be capable of enclosing the chemicals 33 and 35 throughout the exothermic reaction. It is also desirable that the containers 30 and 31 be formed from flexible materials to facilitate the rupture of the container 31 and also to permit the pack 27 to be conformed to a particular surface configuration. This will facilitate the even distribution of heat between the pack 27 and the object to be heated. A particular flexible material having characteristics for withstanding temperatures in excess of 250° C. is the polyester material which is commonly used in cooking bags.

In preferred embodiments of the invention, the first chemical 33 includes a metal salt, such as magnesium chloride, calcium chloride or calcium oxide, and the second chemical 35 includes a polyalcohol, such as ethylene glycol, 1,4-butanediol and glycerol. In some of the preferred embodiments, magnesium chloride and ethylene glycol have been combined in percentages by weight within ranges of 35% to 65% and 65% to 35%, respectively. The highest temperature has been achieved in an embodiment including by weight 50.7% magnesium chloride and 49.3% ethylene glycol.

In an embodiment including magnesium chloride and ethylene glycol, water will typically be present in the ethylene glycol as an intrinsic impurity. It is desirable that this water be maintained within a range of 1 to 4% by weight. An abundance of water may be undesirable since the elevated temperatures produced by the hot pack 27 may tend to transform the liquid water to steam and thereby pressurize the first container 29. However, a little water is desirable in the ethylene glycol since initially the water will react with the magnesium chloride to form magnesium chloride hexahydrate and to give off a first quantity of heat. This first quantity of heat may be of a magnitude sufficient to raise the temperature of the pack 27 to a magnitude such as 110° C. depending on the environment. This first type of chemical reaction, which is illustrated in FIG. 7, will probably occur within the first three seconds after the second container 31 is ruptured and the first and second chemicals 33 and 35, respectively, are mixed.

In producing a chemical reaction between magnesium chloride and ethylene glycol, it is desirable that the particles of magnesium chloride shall be of a small size. Within the limits of particle size tested (mesh size #10 through mesh size #36), it has been found that the best generation was enhanced by decreasing the particle size of the magnesium chloride. The magnesium chloride has been found preferably to have a particle size less than the mesh size of a #32 sieve and has been found preferably to have a water content of approximately one percent (1%) by weight.

Figure 8:
FIG. 8 illustrates a chemical equation showing a second reaction which occurs in a pack including magnesium chloride and ethylene glycol.

The ethylene glycol in the second container 31 will undergo a similar reaction with the magnesium chloride to form magnesium chloride triethylene glycolate to give off a second quantity of heat. This second quantity of heat may raise the temperature of the pack 27 to approximately 160° C. depending on the environment. This second type of chemical reaction is illustrated in FIG. 8 wherein the ethylene glycol is abbreviated "EG."

Figure 9:
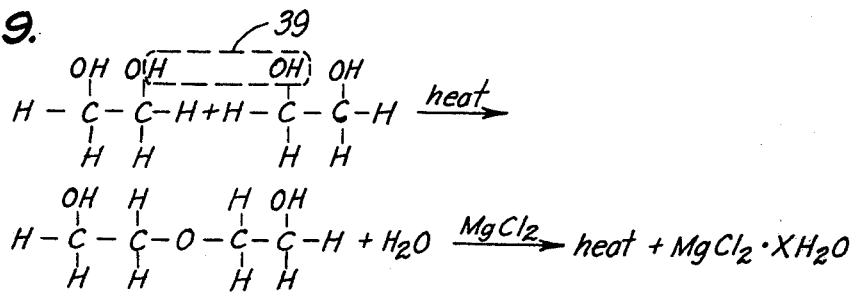
FIG. 9 illustrates a chemical equation showing the bonding characteristics of ethylene glycol in the presence of heat to form diethylene glycol.

In the presence of heat produced in at least one of the first and second types of reactions, the ethylene glycol in the second chemical 35 may undergo a further type of reaction. Thus, the molecules of the ethylene glycol may tend to couple in pairs to form diethylene glycol and water. During this third type of reaction, which is illustrated in FIG. 9, a third quantity of heat will be given off to further increase the temperature of the hot pack 27. Although water is formed in this third type of reaction, it will tend to react with the magnesium chloride as described in the first type of reaction rather than transform to steam. As noted, this reaction also produces heat which makes a further contribution to the temperature of the hot pack 27.

In this third type of reaction, one of the hydroxyl groups associated with each of the ethylene glycol molecules will split off. Also, a hydrogen atom will split off. This hydrogen atom will combine with the hydroxyl group in the other ethylene glycol molecule. This combination will form the water molecule that is given off in the third type of reaction. The water molecule may be formed, for example, by the atoms encircled by the dotted line 39 in FIG. 9. The oxygen ion, which is the remaining portion of the hydroxyl group after the hydrogen is lost, forms an ether linkage with the two carbon atoms associated with the hydroxyl groups which contributed to the formation of the water molecule.

Figure 10:
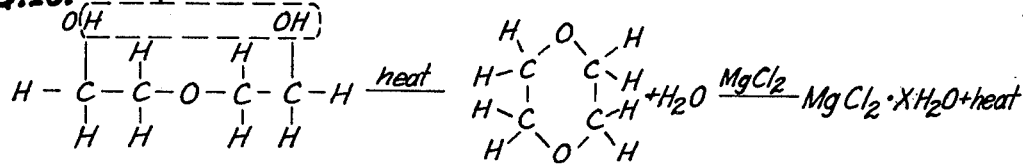
FIG. 10 illustrates a chemical equation showing the decomposition characteristics of diethylene glycol in the present of heat to form a typical organic product such as 1,4-dioxane.

As the temperature of the hot pack 27 rises, the diethylene glycol formed in the third type of reaction will tend to break down and form an oxyaliphatic compound, such as 1,4-dioxane, and water. In this fouth type of reaction, illustrated in FIG. 10, a fouth quantity of heat will be given off to further elevate the temperature of the pack 27. As was the case in the third type of reaction, the water given off in this fourth type of reaction will have a tendency to combine with the magnesium chloride and give off a further quantity of heat.

In this fouth type of reaction, the carbon atoms in the diethylene glycol which do not contribute to the formation of the water molecule in the third type of reaction, illustrated in FIG. 9, will each undergo a chemical reaction. As in the third type of reaction shown in FIG. 9, one of these hydroxyl groups will tend to split-off a hydrogen ion and a hydroxide ion. This hydrogen ion will combine with the hydroxide ions to form the water in the fouth type of reaction. For example, the hydrogen atom and hydroxyl group may be those encircled by the dotted line 41 in FIG. 10.

Figure 11:
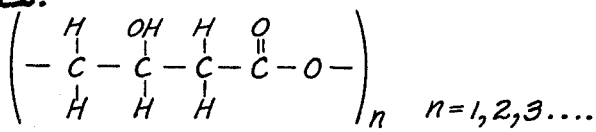
FIG. 11 is the repeating unit of the polymeric material formed by the decomposition products in a hot pack including magnesium chloride and ethylene glycol.

In a final type of reaction, the decomposition products including the diethylene glycol and organic products like 1,4-dioxane will form at least one polymeric compound in the presence of a high temperature. These polymers can have a configuration including the repeating unit illustrated in FIG. 11.

Although the reactions have been described as first through fifth reactions, these reactions may not occur in that sequence. In fact, in most cases they will overlap in time to some extent. Of course, those reactions such as the fouth and fifth reactions which rely upon elevated temperatures will normally occur after those reactions which do not rely upon the presence of heat.

Figure 12:
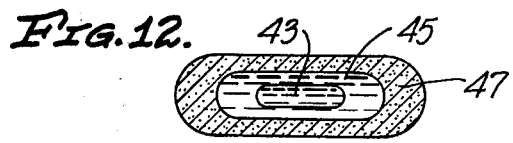
FIG. 12 is a cross-sectional view of the hot pack illustrating the layered configuration that develops during the use of the pack including magnesium chloride and ethylene glycol.

Some of these reactions are quite apparent when viewing the hot pack 27 after its use. As illustrated in FIG. 12, the hot pack 27 will appear to have three relatively distinct layers of chemicals: an inner layer 43, an intermediate layer 45, and an outer layer 47. The outer layer 47 will have a white color which is characteristic of magnesium chloride. Thus, it is believed that the magnesium chloride hexahydrate from the first type of reaction and the magnesium chloride triethylene glycolate from the second type of reaction as well as the diethylene glycol of the third type of reaction appear in this outer layer 47. The intermediate layer 45 has a beige color which is believed to be associated with typical organic products such as 1,4-dioxane which is produced in the fourth type of reaction. It will be recalled that this further reaction occurs only in the presence of a substantial quantity of heat.

The inner layer 43 has a dark brown color and a syrupy configuration which is believed to be associated with the polymers formed during the fifth type of reaction. Again it will be recalled that these polymers are formed only in the presence of a very high heat. Thus, it is believed that the hot pack 27 increases in temperature with progressive positions from the outer layer 47 through the intermediate layer 45 and into the inner layer 43. This is particularly advantageous since the heat which is desirable to support the third, fourth and fifth reactions is at the innermost core of the hot pack 27. Thus, this high temperature heat is allowed to build so that it is not immediately dissipated to the environment.

When the hot pack 27 is initially activated in the manner shown in FIG. 6, it is desirable to manipulate the pack 27 in order to thoroughly mix the first and second chemicals 33 and 35, respectively. If the temperature rises too rapidly, however, the pack 27 will become too hot to handle, in which case the chemicals 35 and 33 may not be thoroughly mixed. In a further embodiment of the invention, the second chemical 35 includes a thickening agent in addition to the ethylene glycol. This thickening agent tends to increase the viscosity of the second chemical 35 to at least initially slow the reaction of the ethylene glycol and the magnesium chloride. With the slowing of these reactions, the temperature tends to build more slowly so that the bag can be handled for a longer period of time to facilitate the mixing of the chemicals 33 and 35.

Figure 13:
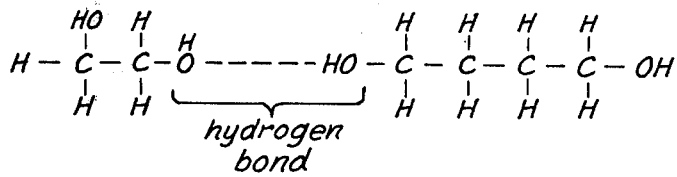
FIG. 13 shows a combination of ethylene glycol and 1,4-butanediol which can be used in an additional embodiment of the hot pack.
Figure 14:
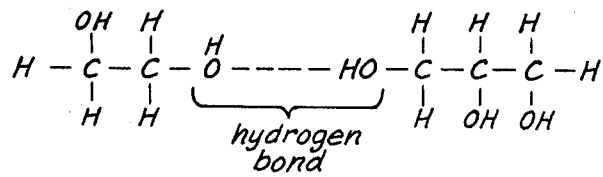
FIG. 14 shows a combination of ethylene glycol and glycerol which can be used in a further embodiment of the hot pack.

In one embodiment of the invention, the thickening agent includes 1,4-butanediol. As shown in FIG. 13, the ethylene glycol molecule shown generally by the arrow 49 and the 1,4-butanediol molecule shown generally by the arrow 51 hydrogen bond to form relatively complex molecules. These complex molecules increase the viscosity of the second chemical 35, thus increasing the reaction time with the magnesium chloride so that the generation of heat in the initial reactions progresses at a slower rate. In preferred embodiments, the 1,4-butanediol is included in a percentage by weight within a range between 5% andd 35%.

In a further embodiment of the invention, the thickening agent included in the second chemical 35 is glycerol. As was the case with the 1,4-butanediol, the glycerol molecule, shown generally by the reference numeral 53, forms a relatively complex molecule with the ethylene glycol molecule shown generally by the reference numeral 55. In preferred embodiments, the glycerol is included in a percentage by weight within a range between 5% and 95%.

The hot pack 27 of the present invention provides a source of heat which can be highly desirable for many purposes. The hot pack 27 can provide a very high temperature in the vicinity of 250° C. It is lightweight and portable and, therefore, can be carried to remote regions with ease. Furthermore, it can be activated without the use of any special tools or apparatus. The reactions initiated by the first and second chemicals 33 and 35, respectively, produce no toxic or caustic products. The hot pack 27 is self-contained so that no opening need be provided for the escape of pressurizing gases.

The hot pack 27 is particularly desirable for use in the disclosed method for cable splicing. The contents of the hot pack 27 at least initially have a generally fluid configuration so that the first container 29 can be conformed to substantially any surface configuration. The fluid contents also provide for generally uniform heat distribution over the area of contact. Thus, the hot pack 27 can be easily disposed around the sleeve 23 to hermetically seal and insulate the junction 25.

The addition of a thickening agent such as 1,4-butanediol or glycerol to the ethylene glycol can slow the rise in temperature for a period sufficient to permit thorough mixing of the chemicals 33 and 35.

Although the invention has been disclosed with reference to specific embodiments of the hot pack 27 and specific steps in the cable splicing method, it will be apparent that the invention can be otherwise embodied and performed respectively so that the invention should be ascertained only with reference to the following claims.

I claim:

1. A portable heat source, including:
   a first sealed container;
   a second container disposed in the first container;
   first chemical means disposed within the first container exteriorly of the second container;
   second chemical means disposed within the first container interiorly of the second container, the second chemical means including a small amount of water as an intrinsic impurity, the second chemical means having properties when mixed with the first chemical means of reacting exothermically with the first chemical means to produce by-products and to generate heat as a result of such chemical reactions and the by-products and the first chemical means having properties of reacting exothermically at increased temperatures resulting from such generation of heat to produce further by-products and to generate additional heat as a result of such exothermic reactions, the small amount of water having properties of reacting with the first chemical means to facilitate the initiation of the reaction of the first chemical means with the second chemical means;
   the second container having properties for being ruptured to release the second chemical means into contact with the first chemical means to permit the mixing of the first chemical means with the second chemical means and the exothermic reaction of the first and second chemical means and the subsequent exothermal reaction of the by-products and the first chemical means.

2. The heat source recited in claim 1 wherein the first container is sealed to contain the first chemical means and the second chemical means after rupture of the second chemical means and to contain the products of the reactions between the first chemical means and the second chemical means.

3. The heat source recited in claim 1 further comprising means disposed in one of the first container and the second container for slowing the reaction of the first chemical means and the second chemical means so that the temperature of the heat source rises more slowly to facilitate handling of the heat source and thereby permit thorough mixing of the first chemical means and the second chemical means.

4. The heat source recited in claim 3 wherein the reaction - slowing means includes a thickening agent for one of the first and second chemicals and the first chemical is in the form of small solid particles and the third chemical is in the form of a solid.

5. The heat source recited in claim 3 wherein the second chemical means includes ethylene glycol.

6. The heat source recited in claim 5 wherein the means for slowing the reaction includes glycerol.

7. The heat source recited in claim 5 wherein the means for slowing the reaction includes 1,4-Butanediol.

8. The heat source recited in claim 5 wherein the first chemical means includes at least one material selected from a group consisting of magnesium chloride, calcium oxide and calcium chloride.

9. The heat source recited in claim 8 wherein individual ones of the further by-products have properties of polymerizing at the elevated temperatures produced by the generation of heat from the exothermic reactions producing the by-products and the further by-products.

10. The heat source set forth in claim 5 wherein the second chemical means includes a limited amount of water in the form of an intrinsic impurity for reacting chemically with the magnesium chloride in an exothermic reaction to generate heat.

11. The combination set forth in claim 10 wherein the first chemical has a range of approximately thirty-five percent (35%) to sixty-five percent (65%) by weight and the second chemical has a range of approximately sixty-five percent (65%) to thirty-five percent (35%) by weight.

12. The combination set forth in claim 11 wherein the intrinsic impurity of water has a range of approximately one percent (1%) to four percent (4%) by weight.

13. The combination set forth in claim 12 wherein a thickening agent selected from glycerol and 1,4-butanediol is included in the second chemical in the range of five percent (5%) to thirty-five percent (35%).

14. The heat source recited in claim 1 wherein the first and second containers are formed from a flexible material and the first and second chemical means, at least after activation, have generally fluid characteristics whereby the heat source can be conformed to an irregular surface configuration.

15. The heat source recited in claim 1 wherein the first chemical means is a solid in the form of small particles.

16. A combination, including:
first chemical means having generally fluid properties;
first retaining means;
second chemical means disposed in the first retaining means with the first chemical means and having properties for reacting chemically with the first chemical means in a flameless, non-explosive sequence of first exothermic reactions involving the first and second chemical means to produce first non-toxic by-products and the generation of heat as a result of such chemical reactions to produce first increases in temperature and to produce subsequent exothermic chemical reactions involving the non-toxic by-products and the first chemical means at elevated temperatures resulting from the first increases in temperature to produce further generations of heat and further increases in temperature and to produce further non-toxic by-products; and
second means for maintaining the first chemical means in the first retaining means in chemically isolated relationship to the second chemical means until a chemical reaction is to be produced between the first and second chemical means and for thereafter providing for a controlled introduction of the second chemical means to the first chemical means to initiate the sequence of chemical reactions.

17. The combination recited in claim 16 wherein the first chemical means includes ethylene glycol and the second chemical means includes a salt and the ethylene glycol has properties of reacting chemically and exothermically with the salt in a glycolation reaction to produce the first non-toxic by-products and the first increases in temperature.

18. The combination set forth in claim 17 wherein the ethylene glycol includes an intrinsic impurity of water in a particular limited percentage and the water has the properties of reacting chemically and exothermically with the salt in a hydration reaction to release a second quantity of heat for facilitating the initiation of the sequence of chemical and exothermic reactions involving the ethylene glycol and the by-products of such chemical reactions.

19. The combination set forth in claim 18 wherein the ethylene glycol is responsive to increase in temperature resulting from the generation of at least one of the first quantity of heat and the second quantity of heat to form diethylene glycol in an exothermic reaction and to release a third quantity of heat for producing a further increase in temperature.

20. The combination set forth in claim 19 wherein the diethylene glycol is responsive to increases in temperature resulting from the generation of at least one of the first quantity of heat, the second quantity of heat, and the third quantity of heat to form an oxyaliphatic compound 1,4-dioxane in an exothermic reaction and to release a fourth quantity of heat.

21. The combination set forth in claim 18 wherein the second chemical means includes at least one salt selected from a group consisting of magnesium chloride, calcium chloride and calcium oxide.

22. The combination set forth in claim 21 wherein the first means includes glycerol for slowing the chemical reaction between the first chemical means and the second chemical means to reduce the rate at which the successive chemical reactions occur.

23. The combination set forth in claim 17 wherein the salt includes at least one salt selected from a group consisting of magnesium chloride and calcium oxide and calcium chloride.

24. The combination set forth in claim 23 wherein the first chemical means has a percentage by weight of approximately thirty-five percent (35%) to sixty-five percent (65%) and the second chemical means has a percentage by weight of approximately sixty-five percent (65%) to thirty-five percent (35%).

25. The combination set forth in claim 24 wherein the intrinsic impurity of the water is in the range of approximately one percent (1%) to four percent (4%) by weight.

26. The combination set forth in claim 25 wherein the second chemical means is in the form of small particles.

27. The combination set forth in claim 26 wherein a thickening agent selected from 1,4-butanediol and glycerol is included in the first chemical means.

28. The combination set forth in claim 27 wherein the thickening agent has a percentage by weight of approximately five percent (5%) to thirty-five percent (35%).

29. The combination recited in claim 16 further comprising third chemical means for slowing the reaction between the first chemical means and the second chemical means to reduce the rate at which the combination produces the heat providing the elevated temperatures.

30. The combination set forth in claim 16 wherein the further non-toxic by-products have characteristics of polymerizing.

31. A hot pack, including:
a first container;
a second container disposed in the first container;
a first chemical disposed in the first container exteriorly of the second container;
a second chemical disposed in the second container and having properties for reacting chemically with the first chemical to initiate a plurality of heat producing chemical reactions, some of the reactions occurring in sequence and at incrementally elevated temperatures and involving by-products of previous chemical reactions, the second chemical including an intrinsic impurity of a small amount of water capable of reacting chemically with the first chemical to generate heat for facilitating the initiation of the plurality of chemical reactions;
the second container having properties for being ruptured to permit the mixing and chemical reacting of the first chemical and the second chemical; whereby
each of the plurality of reactions provides a quantity of heat which tends to increase the temperature of the hot pack.

32. The hot pack recited in claim 31 wherein:
the first chemical and the second chemical have properties of entering a first chemical reaction to liberate a first quantity of heat which elevates the temperature of the hot pack to a first magnitude;
at least one of the chemicals in the first container has properties of entering a second chemical reaction at a temperature approximating the temperature of the first magnitude to provide a third chemical and to liberate a second quantity of heat which elevates the temperature of the hot pack to a second magnitude higher than the first magnitude;
at least one of the chemicals in the first container has properties of entering a third chemical reaction at a temperature approximating the temperature of the second magnitude to provide a fourth chemical and to liberate a third quantity of heat which elevates the temperature of the hot pack to a third magnitude higher than the second magnitude; and
at least one of the chemicals in the first container has properties of entering a fourth chemical reaction at a temperature approximating the third magnitude to provide a fifth chemical.

33. The hot pack set forth in claim 32 wherein:
the first chemical is
in the form of small solid particles and the second chemical is a liquid.

34. The combination set forth in claim 33 wherein
the first chemical is selected from a group consisting of magnesium chloride, calcium oxide and calcium chloride and the second chemical constitutes ethylene glycol.

35. The combination set forth in claim 34 wherein a thickening agent selected from glycerol and 1,4-butanediol is included in the second chemical.

36. The hot pack set forth in claim 32 wherein the second chemical has properties of combining with itself in the second reaction to provide the third chemical, and the third chemical breaks down in the third reaction to provide the fourth chemical.

* * * * *